(12) United States Patent
You et al.

(10) Patent No.: US 11,988,836 B2
(45) Date of Patent: May 21, 2024

(54) VIRTUAL IMAGE DISPLAY DEVICE

(71) Applicant: Samsung Display Co., Ltd., Yongin-si (KR)

(72) Inventors: Jaeho You, Gwangmyeong-si (KR); Youngchan Kim, Incheon (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 383 days.

(21) Appl. No.: 17/370,463

(22) Filed: Jul. 8, 2021

(65) Prior Publication Data
US 2022/0050296 A1 Feb. 17, 2022

(30) Foreign Application Priority Data
Aug. 13, 2020 (KR) .................. 10-2020-0101724

(51) Int. Cl.
*G02B 27/01* (2006.01)
*G02B 27/42* (2006.01)

(52) U.S. Cl.
CPC ..... *G02B 27/0172* (2013.01); *G02B 27/4205* (2013.01); *G02B 2027/0112* (2013.01); *G02B 2027/013* (2013.01); *G02B 2027/0178* (2013.01)

(58) Field of Classification Search
CPC ............ G02B 27/0172; G02B 27/4205; G02B 2027/0112; G02B 2027/013; G02B 2027/0178; G02B 2027/0105; G02B 2027/0123; G02B 2027/0134; G02B 27/0103; G02B 2027/0118; G02B 5/04
See application file for complete search history.

(56) References Cited

U.S. PATENT DOCUMENTS

| | | | | |
|---|---|---|---|---|
| 5,224,198 A | * | 6/1993 | Jachimowicz | G02B 6/003 359/13 |
| 6,577,411 B1 | * | 6/2003 | David | G02B 27/02 351/159.41 |
| 9,007,685 B2 | | 4/2015 | Yokoyama | |
| 10,474,411 B2 | | 11/2019 | Rochford et al. | |
| 10,700,048 B2 | * | 6/2020 | Zhang | G03B 21/005 |
| 11,119,261 B1 | * | 9/2021 | Ayres | G03H 1/0248 |

(Continued)

FOREIGN PATENT DOCUMENTS

| | | |
|---|---|---|
| JP | 5906692 | 4/2016 |
| JP | 6274971 | 2/2018 |

(Continued)

*Primary Examiner* — Collin X Beatty
(74) *Attorney, Agent, or Firm* — KILE PARK REED & HOUTTEMAN PLLC

(57) ABSTRACT

A virtual image display device includes first and second light combining parts spaced apart from each other, a first display part on a first inclined surface of the first light combining part, a second display part on a second inclined surface of the first light combining part, a third display part on a third inclined surface of the second light combining part, a fourth display part on a fourth inclined surface of the second light combining part, a first light diffraction part on a first light output surface of the first light combining part, and a second light diffraction part on a second light output surface of the second light combining part. Two of the first to fourth display parts output images of a same color light, and the other two of the first to fourth display parts output images of different color light.

20 Claims, 12 Drawing Sheets

(56) References Cited

U.S. PATENT DOCUMENTS

| | | | | |
|---|---|---|---|---|
| 2006/0018024 A1* | 1/2006 | Bryant | ............... | G02B 27/0101 |
| | | | | 359/618 |
| 2014/0240843 A1* | 8/2014 | Kollin | ................ | G02B 27/0172 |
| | | | | 359/633 |
| 2018/0292655 A1* | 10/2018 | Smithwick | .............. | G06T 19/00 |
| 2019/0094981 A1* | 3/2019 | Bradski | ................ | H04N 21/414 |
| 2020/0004018 A1 | 1/2020 | Lee et al. | | |
| 2021/0311311 A1* | 10/2021 | Khan | ................... | H04N 13/361 |
| 2022/0179222 A1* | 6/2022 | Guo | .................... | G02B 5/1861 |

FOREIGN PATENT DOCUMENTS

| | | |
|---|---|---|
| KR | 10-2019-0063443 | 6/2019 |
| KR | 10-2020-0001863 | 1/2020 |

* cited by examiner

VIRTUAL IMAGE DISPLAY DEVICE

CROSS-REFERENCE TO RELATED APPLICATION(S)

This application claims priority to and benefits of Korean Patent Application No. 10-2020-0101724 under 35 U.S.C. § 119, filed in the Korean Intellectual Property Office on Aug. 13, 2020, the entire contents of which are incorporated herein by reference.

BACKGROUND

1. Technical Field

The disclosure relates to a virtual image display device having improved reliability.

2. Discussion of the Related Art

In recent years, a virtual image display device worn on a body of a user to provide virtual reality (VR) or augmented reality (AR) has been developed. For example, there is a head mounted display worn on a head or a glass-type display device. The user may receive a virtual image that may be totally different from the real world or simultaneously recognize a real substantial object and a virtual image through the virtual image display device.

User demand for reducing a volume and a weight of the virtual image display device. Also, demand for improving a side door effect (SDE) phenomenon has increased.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

The disclosure provides a virtual image display device that may have improved resolution, optical efficiency, and luminance.

An embodiment of the disclosure provides a virtual image display device that may include a first light combining part; a second light combining part spaced apart from the first light combining part and disposed adjacent to the first light combining part in a direction, a first display part disposed on a first inclined surface of the first light combining part, a second display part disposed on a second inclined surface of the first light combining part, a third display part disposed on a third inclined surface of the second light combining part, a fourth display part disposed on a fourth inclined surface of the second light combining part, a first light diffraction part disposed on a first light output surface of the first light combining part, and a second light diffraction part disposed on a second light output surface of the second light combining part. Two of the first to fourth display parts may output images of a same color light, and the other two of the first to fourth display parts may output images of different color light.

In an embodiment, each of the first display part and the second display part may output images of different colored light, and each of the third display part and the fourth display part may output images of different color light.

In an embodiment, each of the first display part, the second display part, the third display part, and the fourth display part may output a red light, green light or blue light image.

In an embodiment, an angle between the first light output surface and each of the first inclined surface and the second inclined surface may be an acute angle, and an angle between the second light output surface and each of the third inclined surface and the fourth inclined surface may be an acute angle.

In an embodiment, the angle between the first light output surface and the first inclined surface may be different from the angle between the first light output surface and the second inclined surface.

In an embodiment, in case that an image outputted from the first display part has a wavelength shorter than a wavelength of an image outputted from the second display part, the angle between the first light output surface and the first inclined surface may be less than the angle between the first light output surface and the second inclined surface.

In an embodiment, at least one of the first inclined surface, the second inclined surface, the third inclined surface, the fourth inclined surface, the first light output surface, and the second light output surface may be a curved surface, and the curved surface may be convex in an inward direction of at least one of the first light combining part and the second light combining part.

In an embodiment, each of the first light diffraction part and the second light diffraction part may include a base portion, and protruding portions that protrude from the base portion, and the protruding portions may be arranged with a period in the direction.

In an embodiment, each of the first light diffraction part and the second light diffraction part may include a first sub-diffraction portion, and a second sub-diffraction portion having a refractive index different from a refractive index of the first sub-diffraction portion, each of the first sub-diffraction portion and the second sub-diffraction portion may be provided in plurality, and the plurality of first sub-diffraction portions and the plurality of second sub-diffraction portions may be sequentially arranged in the direction.

In an embodiment, the second display part and the third display part may be adjacent to each other, and each of the second display part and the third display part may output images of a same color light.

In an embodiment, the second display part and the third display part may be integral with each other and disposed in a space between the first light combining part and the second light combining part.

In an embodiment, the virtual image display device may further include an optical functional layer disposed on the second display part and the third display part and including protruding portions.

In an embodiment, the optical functional layer may include a prism sheet.

In an embodiment, the virtual image display device may further include a first condensing lens disposed on the first light diffraction part, and a second condensing lens disposed on the second light diffraction part.

In an embodiment, each of the first, display part, the second display part, the third display part, and the fourth display part may include a display panel, and the display panel may be at least one of an organic light emitting display panel, a liquid crystal display panel, or a micro-light emitting diode display panel.

In an embodiment, one of the first light combining part and the second light combining part may correspond to a left eye of a user, and the other of the first light combining part and the second light combining part may correspond to a right eye of the user.

In an embodiment of the disclosure, a virtual image display device may include a light combining part including a top surface, a light output surface parallel to the top surface, a first inclined surface adjacent to a side of each of the top surface and the light output surface, and a second inclined surface adjacent to another side of each of the top surface and the light output surface, the side and the other side of each of the top surface and the light output surface facing each other, a first display part disposed on the first inclined surface, a second display part disposed on the second inclined surface, and a light diffraction part disposed on the light output surface. An angle between the light output surface and each of the first inclined surface and the second inclined surface may be an acute angle, and each of the first display part and the second display part may output images of different color light.

In an embodiment, the virtual image display device may further include a condensing lens spaced apart from the light diffraction part and disposed parallel to the light output surface.

In an embodiment, the light diffraction part may be disposed parallel to the light output surface, the light diffraction part may include sub-diffraction portions arranged with a period in a direction, and light incident at a first angle from the first display part may be transmitted through the light combining part and outputted at a light output angle that satisfies the equation:

$$\theta' = A\sin\left\{N1 \cdot \sin(\theta) \pm m \cdot \left(\frac{\lambda}{T}\right)\right\}.$$

In the above equation, $\theta'$ may be the light output angle, N1 may be a refractive index of the light combining part, $\theta$ may be the first angle, m may be an integer, $\lambda$ may be a wavelength of the incident light, and T may be the period.

In an embodiment, in case that an image outputted from the first display part has a wavelength shorter than a wavelength of an image outputted from the second display part, the angle between the light output surface and the first inclined surface may be less than the angle between the light output surface and the second inclined surface.

BRIEF DESCRIPTION OF THE DRAWINGS

The accompanying drawings are included to provide a further understanding of the disclosure, and are incorporated in and form a part of this specification. The drawings illustrate embodiments of the disclosure and, together with the description, serve to explain principles of the disclosure. In the drawings.

DETAILED DESCRIPTION OF THE EMBODIMENTS

Figure 1:
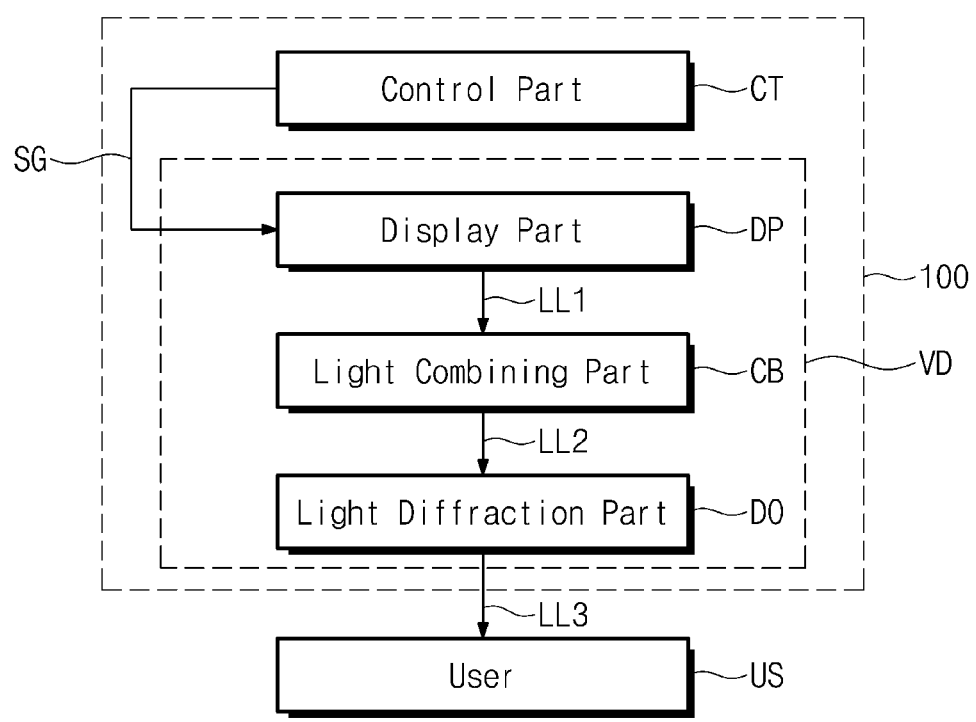
FIG. 1 is a schematic block diagram representing components of an electronic device including a virtual image display device according to an embodiment of the disclosure.

Hereinafter, a virtual image display device and an electronic device including the same according to an embodiment of the disclosure will be described with reference to the accompanying drawings.

Since the disclosure may have diverse modified embodiments, only some embodiments are illustrated in the drawings and are described in the detailed description of the embodiments. However, these embodiments do not limit the disclosure within specific embodiments and it should be understood that the disclosure covers all the modifications, equivalents, and replacements within the idea and technical scope of the disclosure.

In this disclosure, it will also be understood that when a component (or region, layer, portion) is referred to as being "on", "connected to", or "coupled to" another component, the component can be directly disposed/connected/coupled on/to another component, or an intervening third component may also be present.

Like reference numerals refer to like elements throughout. Also, in the figures, the thickness, ratio, and dimensions of components may be exaggerated for clarity of illustration.

The term "and/or" includes any and all combinations of one or more of the associated listed items. For example, "A and/or B" may be understood to mean "A, B, or A and B." The terms "and" and "or" may be used in the conjunctive or disjunctive sense and may be understood to be equivalent to "and/or."

It will be understood that although the terms such as "first" and "second" are used herein to describe various elements, these elements should not be limited by these terms. The terms are only used to distinguish one component from other components. For example, a first element referred to as a first element in one embodiment can be referred to as a second element in another embodiment without departing from the scope of the appended claims. Terms of a singular form may include plural forms (and vice versa) unless the context clearly indicates otherwise.

"Under", "below", "above", "upper", and the like are used for explaining relation association of components illustrated in the drawings. The terms may be a relative concept and described based on directions expressed in the drawings.

Unless otherwise defined or implied, all terms (including technical and scientific terms) used herein have the same meaning as generally understood by those skilled in the art. Terms as defined in a commonly used dictionary should be construed as having the same meaning as in an associated technical context, and unless so indicated in the description, the terms are not to be ideally or excessively construed as having an excessively formal meaning.

The meaning of "include", "has", "have", and "comprise" specifies a property, a fixed number, a step, an operation, an element, a component or a combination thereof, but does not exclude other properties, fixed numbers, steps, operations, elements, components or combinations thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

The term overlap may include layer, stack, face or facing, extending over, covering or partly covering or any other suitable term as would be appreciated and understood by those of ordinary skill in the art. In the specification and the claims, the phrase "at least one of" is intended to include the meaning of "at least one selected from the group of" for the purpose of its meaning and interpretation. For example, "at least one of A and B" may be understood to mean "A, B, or A and B."

Figure 2:
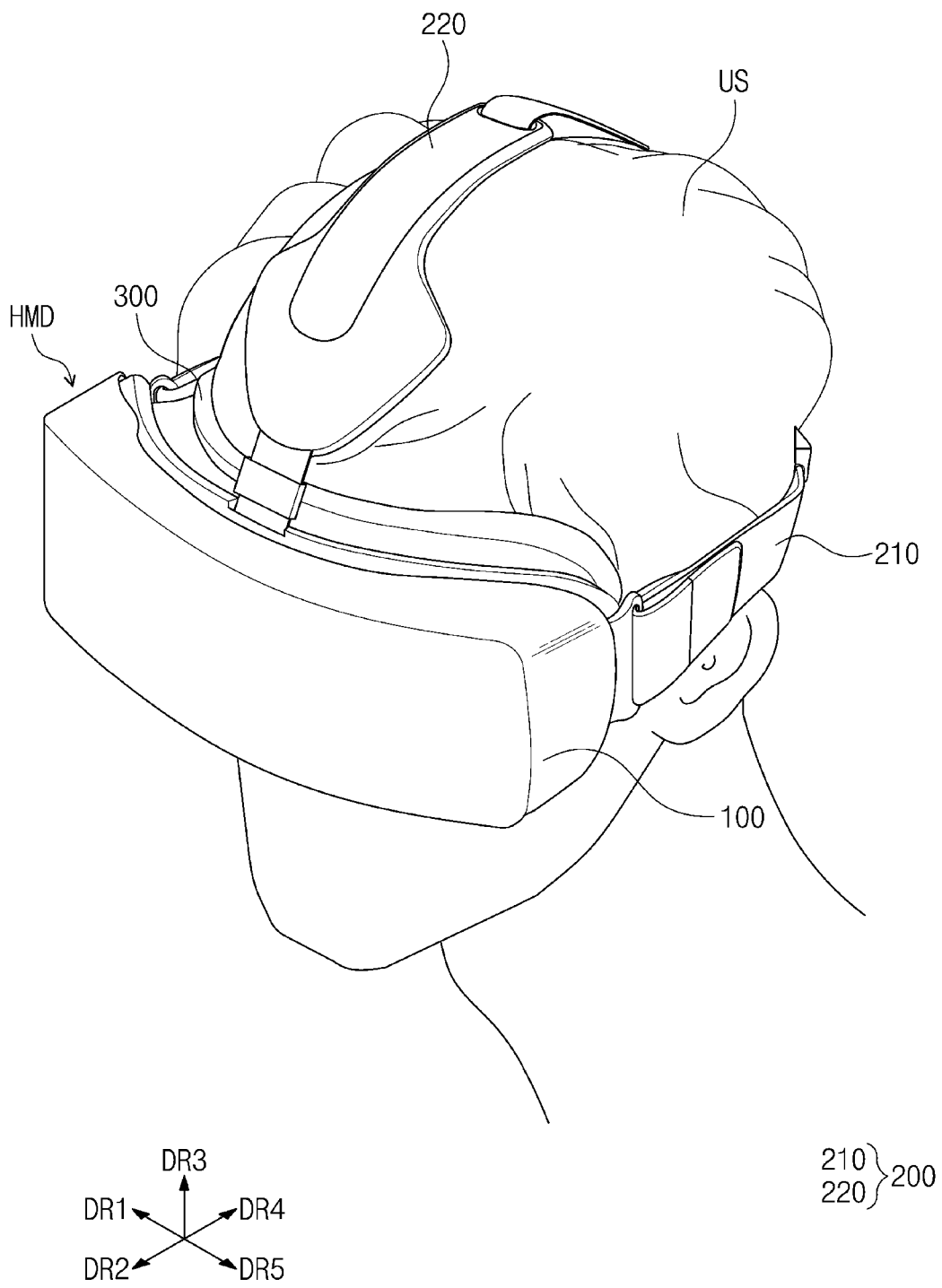
FIG. 2 is a schematic perspective view illustrating a state of a user wearing a head mounted display including the electronic device according to an embodiment.

FIG. 1 is a schematic block diagram representing components of an electronic device including a virtual image display device according to an embodiment of the disclosure. FIG. 2 is a schematic perspective view illustrating a state of a user wearing a head mounted display including the electronic device according to an embodiment.

Referring to FIG. 1, an electronic device 100 may include a control part CT and a virtual image display device VD. The virtual image display device VD may include a display part DP, a light combining part CB, and a light diffraction part DO.

The virtual image display device VD may be a display device realizing virtual reality (VR) or augmented reality (AR). For example, the virtual image display device VD may provide an image of a virtual world that may be different from a real world recognized by a user or provide a virtual image or information in conjunction with an image of the real world recognized by the user.

The control part CT may control images outputted to the display part DP by transmitting a signal SG (hereinafter, referred to as the signal) to the display part DP. The signal SG may be an electrical signal. An acceleration sensor or a proximity sensor may sense movement or eye gaze of the user US, and the control part CT may provide the signal SG corresponding to a variation recognized by the sensor and output an image to the display part DP. Also, the control part CT may sense an external input and output an image corresponding to the external input to the display part DP.

The display part DP receiving the signal SG from the control part CT may output an image and transmit output light LL1 to the light combining part CB. The output light LL1 transmitted from the display part DP may be combined in the light combining part CB. For example, the output light LL1 outputted from multiple display parts DP may be transmitted to a light combining part CB, and the output light LL1 may overlap each other in the light combining part CB.

The light combining part CB may transmit the received output light LL1 to the light diffraction part DO through a light output surface, and the light outputted from the light combining part CB may be defined as combined light LL2. The combined light LL2 may be incident to the light diffraction part DO at various angles.

The light diffraction part DO may output the incident combined light LL2 at an angle different from the incident angle. The light outputted from the light diffraction part DO may be defined as diffracted light LL3. The diffracted light LL3 may be transmitted to eyes of the user US and image-formed on the eyes of the user US.

Thus, the display part DP receiving the signal SG through the control part CT may output the output light LL1, which may be able to display an image, to the light combining part CB. The received output light LL1 may be combined in the light combining part CB, and the combined light LL2 may be transmitted to the light diffraction part DO. The combined light LL2 may be diffracted while passing through the light diffraction part DO, and the diffracted light LL3, which may be obtained as the combined light LL2 may be diffracted, may be transmitted to the eyes of the users US.

The virtual image display device VD may be applied to the electronic device 100. Various types of electronic devices 100 including the virtual image display device VD may be used by the user US. For example, the electronic device 100 may be a wearable device and provide an image to the user US. For example, the electronic device 100 including the virtual image display device VD according to embodiments of the disclosure may have a shape such as a head mounted display that may be worn on the head of the user US or a glasses-type display that may be worn on the user US like glasses. FIG. 2 is a view illustrating a state in which the user US wears a head mounted display HMD.

The head mounted display HMD according to an embodiment may include an electronic device 100, a wearing part 200, and a cushion part 300. The electronic device 100 may further include a frame, and the control part CT (refer to FIG. 1) and the virtual image display device VD (refer to FIG. 1) may be accommodated in the frame. The virtual image display device VD may be covered by the frame.

The electronic device 100 may cover eyes of the user US in correspondence to a left eye and a right eye of the user US. The virtual image display device VD may include light combining parts CB1 and CB2 (refer to FIG. 3), and the light combining parts CB1 and CB2 (refer to FIG. 3) may be disposed in correspondence to the left eye and the right eye of the user US, respectively.

Referring to FIG. 2, the head mounted display HMD may provide an image to the user US through the virtual image display device VD in a state in which a surrounding view in substantial reality of the user US may be blocked. Thus, the user US wearing the virtual image display device VD in the form of the head mounted display HMD may be further easily absorbed into virtual reality.

The wearing part 200 may be extended to the electronic device 100 so that the user US easily wears the virtual image display device VD. In FIG. 2, the wearing part 200 including a main strap 210 worn by surrounding the head of the user US, an upper strap 220 connecting the electronic device 100 and the main strap 210 along an upper portion of the head is illustrated.

The main strap 210 may fix the electronic device 100 so that the electronic device 100 closely contacts the head of the user US. The upper strap 220 may prevent the electronic device 100 from sliding down and distribute a weight of the electronic device 100 to further improve wearing comfort of the user US.

Although each of the main strap 210 and the upper strap 220 has a shape capable of adjusting a length thereof in FIG. 2, embodiments of the disclosure are not limited thereto. For example, a portion adjusting the length of each of the main strap 210 and the upper strap 220 may be omitted, and each of the main strap 210 and the upper strap 220 may have an elastic band shape.

The wearing part 200 may be formed in various shapes capable of fixing the virtual image display device VD to the user US beyond the shape shown in FIG. 2. For example, the upper strap 220 may be omitted. Also, the wearing part 200 according to an embodiment of the disclosure may be formed in various shapes such as eyeglass frames or a helmet provided with the virtual image display device VD.

The cushion part 300 may closely contact a face of the user US in case that the head mounted display HMD may be worn. The cushion part 300 may have a freely deformable shape and absorb an impact applied to the head mounted display HMD. For example, the cushion part 300 may be a polymer resin or a foam sponge and include polyurethane, polycarbonate, polypropylene, polyethylene, etc., or a combination thereof. However, embodiments of the disclosure are not limited with respect to the material of the cushion part 300. Also, the cushion part 300 may be omitted.

Figure 3:
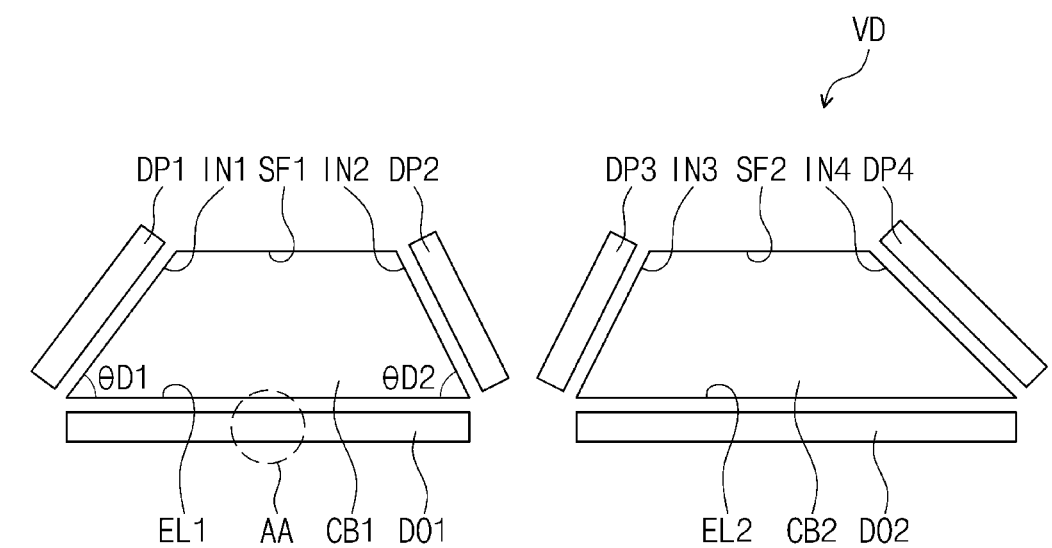
FIG. 3 is a schematic plan view of a virtual image display device according to an embodiment of the disclosure.
Figure 4:
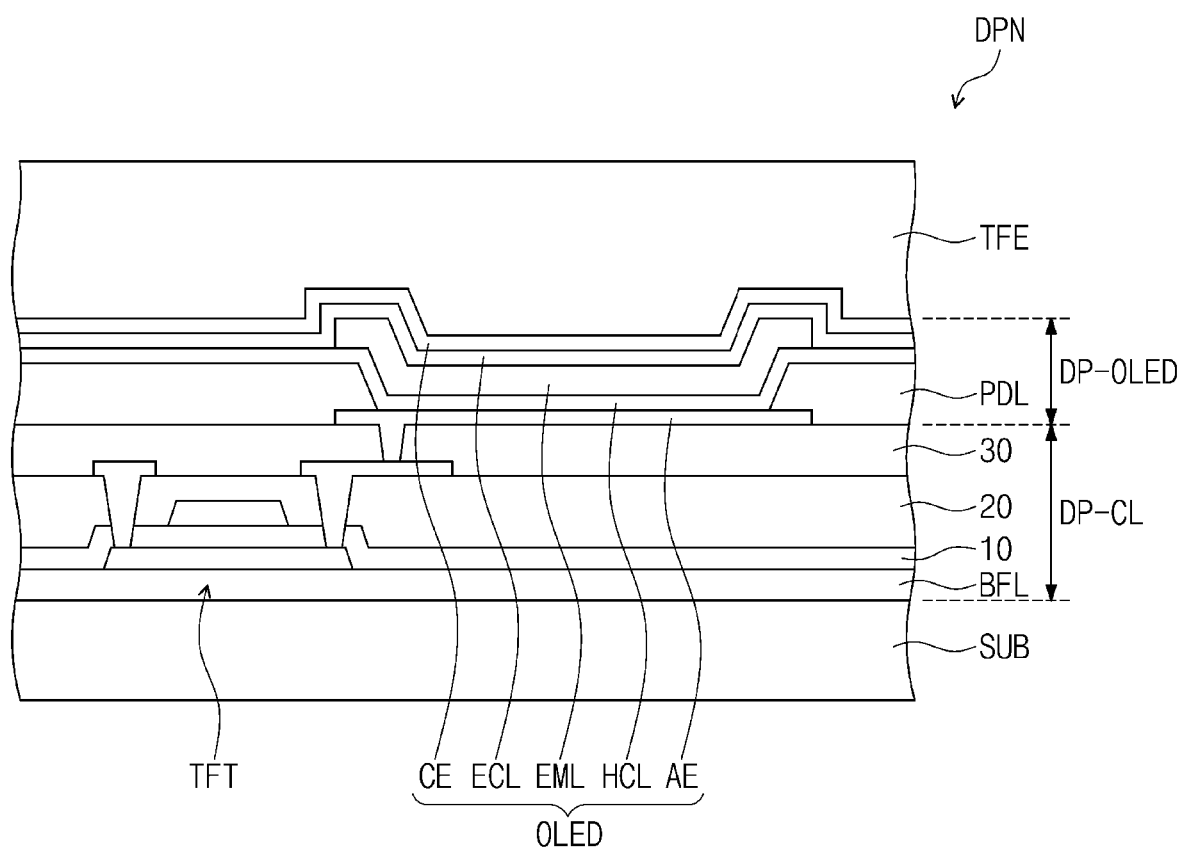
FIG. 4 is a schematic cross-sectional view of a display panel according to an embodiment of the disclosure.

FIG. 3 is a schematic plan view of the virtual image display device according to an embodiment of the disclosure. FIG. 4 is a schematic cross-sectional view of a display panel according to an embodiment of the disclosure.

Referring to FIG. 3, the virtual image display device VD may include light combining parts CB1 and CB2, a display part DP1, DP2, DP3, and DP4, and light diffraction parts DO1 and DO2.

The virtual image display device VD may include light combining parts CB1 and CB2. The virtual image display device VD may include a first light combining part CB1 and a second light combining part CB2. The first light combining part CB1 and the second light combining part CB2 may be spaced apart from each other and disposed adjacent to each other in a direction of a first directional axis DR1. The first light combining part CB1 may correspond to a left eye US-L of the user, and the second light combining part CB2 may correspond to a right eye US-R of the user.

Each of the first and second light combining parts CB1 and CB2 may include a top surface SF1 and SF2, a light output surface EL1 and EL2, and inclined surfaces IN1, IN2, IN3, and IN4. In this disclosure, each of the top surfaces SF1 and SF2 of the first and second light combining parts CB1 and CB2 may be a surface facing a front side of the user and a surface parallel to a plane defined by the direction of the first directional axis DR1 and a direction of a third directional axis DR3.

The first top surface SF1 of the first light combining part CB1 may be parallel to the first light output surface EL1 in the direction of the first directional axis DR1 and spaced apart from the first light output surface EL1 in a direction of a second directional axis DR2. The second top surface SF2 of the second light combining part CB2 may be parallel to the second light output surface EL2 in the direction of the first directional axis DR1 and spaced apart from the second light output surface EL2 in the direction of the second directional axis DR2.

The first light combining part CB1 may include the first light output surface EL1, the first top surface SF1, the first inclined surface IN1, and the second inclined surface IN2. The first inclined surface IN1 may be adjacent to a side of each of the first top surface SF1 and the first light output surface ELL The second inclined surface IN2 may be adjacent to another side of each of the first top surface SF1 and the first light output surface EL1.

The second light combining part CB2 may include the second light output surface EL2, the second top surface SF2, the third inclined surface IN3, and the fourth inclined surface IN4. The third inclined surface IN3 may be adjacent to a side of each of the second top surface SF2 and the second light output surface EL2. The fourth inclined surface IN4 may be adjacent to another side of each of the second top surface SF2 and the second light output surface EL2.

Although each of the first and second light combining parts CB1 and CB2 may have a trapezoidal shape having four straight sides on a plane defined by the first directional axis DR1 and the second directional axis DR2, which may intersect each other, this is merely illustrative. For example, at least one of the four sides may be a curved line. However, embodiments of the disclosure are not limited thereto. Each of the first and second light combining parts CB1 and CB2 may have a thickness in the direction of the third directional axis DR3.

Each of the first and second light output surfaces EL1 and EL2 may be parallel to a surface defined by the directions of the first directional axis DR1 and the third directional axis DR3 and output light in a direction of a fourth directional axis DR4 toward the left eye US-L and the right eye US-R of the user.

In this disclosure, a top surface (or a front surface) and a bottom surface (or a rear surface) of each of members may be defined with respect to a direction of light outputted from the light combining parts CB1 and CB2. The top surface and the bottom surface may be opposed to each other in the direction of the fourth directional axis DR4, and a normal direction of each of the top surface and the bottom surface may be parallel to the directions of the second directional axis DR2 and the fourth directional axis DR4.

On the other hand, directions indicated by the first to fifth directional axes DR1, DR2, DR3, DR4, and DR5, as relative concepts, may be converted with each other. Hereinafter, first to fifth directions may be indicated by the first to fifth directional axes DR1, DR2, DR3, DR4, and DR5 and refer to like reference numerals, respectively.

An angle between the first light output surface EL1 and the first inclined surface IN1 of the first light combining part CB1 may be defined as a first angle $\theta D1$, and an angle between the first light output surface EL1 and the second inclined surface IN2 may be defined as a second angle $\theta D2$. Each of the first angle $\theta D1$ and the second angle $\theta D2$ may be an acute angle that may be equal to or less than about 90°. The above description may be equally applied to angles between the second light output surface EL2 and the third inclined surface IN3 and between the second light output surface EL2 and the fourth inclined surface IN4 of the second light combining part CB2.

Each of the light output surfaces EL1 and EL2 and the inclined surfaces IN1, IN2, IN3, and IN4 included in the light combining parts CB1 and CB2 according to an embodiment may be a flat surface as in FIG. 3. However, embodiments of the disclosure are not limited thereto. For example, at least one of the inclined surfaces IN1, IN2, IN3, and IN4 and the light output surfaces EL1 and EL2 may be a curved surface.

The virtual image display device VD may include first to fourth display parts DP1, DP2, DP3, and DP4. The first display part DP1 may be disposed on the first inclined surface IN1, and the second display part DP2 may be disposed on the second inclined surface IN2. The third display part DP3 may be disposed on the third inclined surface IN3, and the fourth display part DP4 may be disposed on the fourth inclined surface IN4. The first to fourth display parts DP1, DP2, DP3, and DP4 may be spaced apart from the first to fourth inclined surfaces IN1, IN2, IN3, and IN4, respectively, or disposed on (e.g., directly disposed on) the first to fourth inclined surfaces IN1, IN2, IN3, and IN4, respectively.

The first inclined surface IN1 may be a flat surface parallel to a direction between the direction of the first directional axis DR1 and the direction of the second directional axis DR2. Although the first display part DP1 may be disposed parallel to the first inclined surface IN1, embodiments of the disclosure are not limited thereto. For example, the first display part DP1 may be disposed inclined to the first inclined surface IN1. The second inclined surface IN2 may be a flat surface parallel to a direction between the direction of the first directional axis DR1 and the direction of the fourth directional axis DR4. Although the second display part DP2 may be disposed parallel to the second inclined surface IN2, embodiments of the disclosure are not limited thereto. For example, the second display part DP2 may be disposed inclined to the second inclined surface IN2.

The third inclined surface IN3 may be a flat surface parallel to a direction between the direction of the first directional axis DR1 and the direction of the second directional axis DR2. Although the third display part DP3 may be disposed parallel to the third inclined surface IN3, embodiments of the disclosure are not limited thereto. For example, the third display part DP3 may be disposed inclined to the third inclined surface IN3. The fourth inclined surface IN4 may be a flat surface parallel to a direction between the direction of the first directional axis DR1 and the direction of the fourth directional axis DR4. Although the fourth display part DP4 may be disposed parallel to the fourth inclined surface IN4, embodiments of the disclosure are not limited thereto. For example, the fourth display part DP4 may be disposed inclined to the fourth inclined surface IN4.

Each of the first to fourth display parts DP1, DP2, DP3, and DP4 may output a colored light image. Two of the first to fourth display parts DP1, DP2, DP3, and DP4 may output a first colored light image, and the rest may output a second colored light image and a third colored light image, which may be different colored light. For example, each of the first to third colored light may be red light, green light, or blue light, and the colored light images outputted from the first to fourth display parts DP1, DP2, DP3, and DP4 may be at least one of red light, green light, and blue light images.

The first display part DP1 and the second display part DP2 included in the virtual image display device VD according to an embodiment may output different color images, and the third display part DP3 and the fourth display part DP4 may output different color images. For example, the first display part DP1 may output the green light image, and the second display part DP2 may output the red light image. Also, the third display part DP3 may output the red light image, and the fourth display part DP4 may output the blue light image. However, embodiments of the disclosure are not limited to the above colored light images outputted from each of the display parts.

A shape of each of the light combining parts CB1 and CB2 may be variously designed according to a wavelength of the colored light image outputted from the first to fourth display parts DP1, DP2, DP3, and DP4. For example, the first angle θD1, which may be the angle between the first light output surface EL1 and the first inclined surface IN1, and the second angle θD2, which may be the angle between the first light output surface EL1 and the second inclined surface IN2, may be varied according to the wavelengths of the colored light images outputted from the first display part DP1 and the second display part DP2.

In case that the first display part DP1 outputs the colored light image having a shorter wavelength than that of the colored light image outputted from the second display part DP2, the first angle θD1 may be less than the second angle θD2. For example, in case that the first display part DP1 outputs the blue light image and the second display part DP2 outputs the red light image, the first inclined surface IN1 may be further inclined to the first light output surface EL1 than the second inclined surface IN2.

The above description may be equally applied to the second light combining part CB2. An angle between the second light output surface EL2 and the third inclined surface IN3 of the second light combining part CB2 and an angle between the second light output surface EL2 and the fourth inclined surface IN4 may be varied according to the wavelengths of the colored light images outputted from the third display part DP3 and the fourth display part DP4.

The first light combining part CB1 may combine images provided from the first display part DP1 and the second display part DP2 and output the combined image through the first light output surface EL1, and the outputted image may be transmitted through the first light diffraction part DO1 and provided to the left eye US-L of the user. The second light combining part CB2 may combine images provided from the third display part DP3 and the fourth display part DP4 and output the combined image through the second light output surface EL2, and the outputted image may be transmitted through the second light diffraction part DO2 and provided to the right eye US-R of the user.

The outputted image transmitted through each of the light combining parts CB1 and CB2 may be affected by a material of each of the light combining parts CB1 and CB2. The light combining parts CB1 and CB2 may be optically clear. For example, the light combining parts CB1 and CB2 may include a polymer material or glass. However, embodiments of the disclosure are not limited to the above-described materials of the light combining parts CB1 and CB2.

The outputted image transmitted through each of the light combining parts CB1 and CB2 may be affected by a refractive index of each of the light combining parts CB1 and CB2. For example, the refractive index of the light combining parts CB1 and CB2 may be about 1.4 to about 1.7. However, embodiments of the disclosure are not limited to the above-described values of the refractive index of the light combining parts CB1 and CB2.

The light diffraction part DO1 and DO2 may be disposed on the light output surface EL1 and EL2. The first light diffraction part DO1 may be disposed on the first light output surface EL1 along a normal direction of the first light output surface ELL The second light diffraction part DO2 may be disposed on the second light output surface EL2 along a normal direction of the second light output surface EL2.

As illustrated in FIG. 3, each of the first and second light output surfaces EL1 and EL2 may be a flat surface parallel to the plane defined by the first directional axis DR1 and the third directional axis DR3, and the first and second light diffraction parts DO1 and DO2 may be disposed on the first and second light output surfaces EL1 and EL2, respectively, in the direction of the fourth directional axis DR4. However, embodiments of the disclosure are not limited to the example in FIG. 3. For example, the first and second light diffraction parts DO1 and DO2 may be disposed on the first and second light output surfaces EL1 and EL2 which may be curved surfaces, respectively.

The first and second light diffraction parts DO1 and DO2 may be disposed on (e.g., directly disposed on) the first and second light output surfaces EL1 and EL2, respectively. Thus, a shape of each of the first and second light diffraction parts DO1 and DO2 may be varied according to a shape of each of the first and second light output surfaces EL1 and EL2. For example, the shape of each of the first and second light diffraction parts DO1 and DO2 may be a flat surface or a curved surface.

Figure 5A:
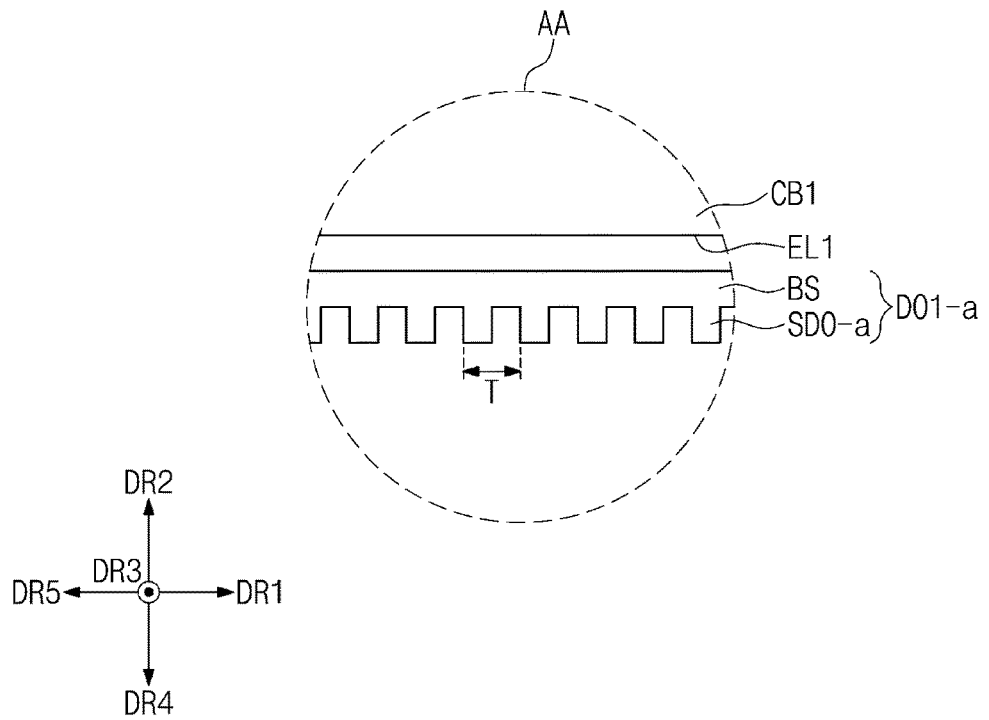
FIG. 5A is an enlarged schematic plan view of a virtual image display device according to an embodiment of the disclosure.
Figure 5B:
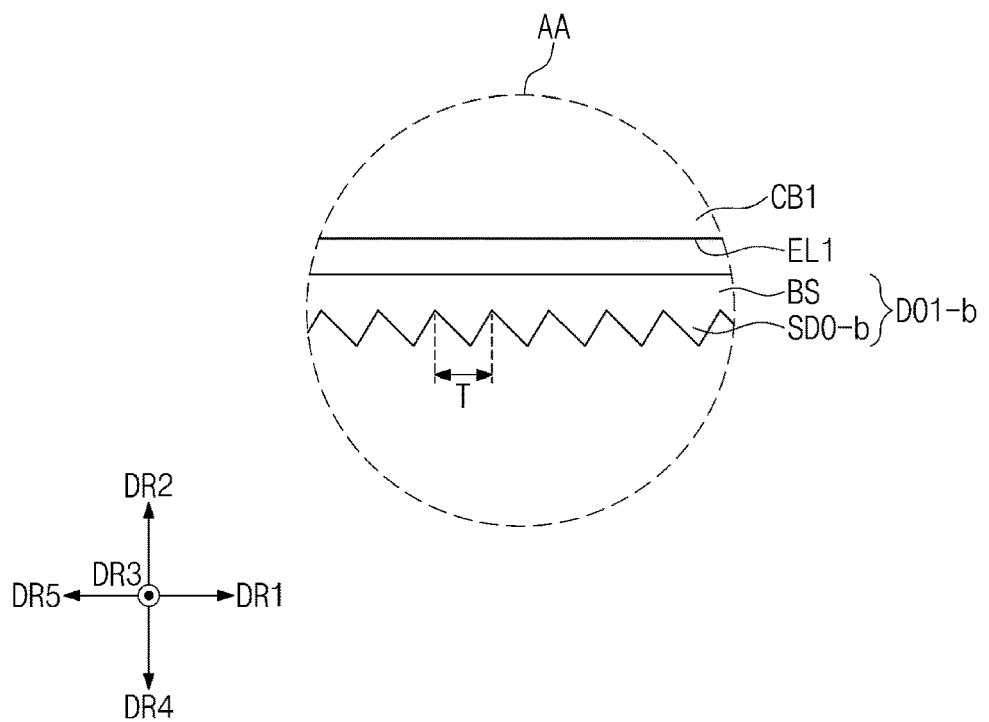
FIG. 5B is an enlarged schematic plan view of a virtual image display device according to an embodiment of the disclosure.
Figure 5C:
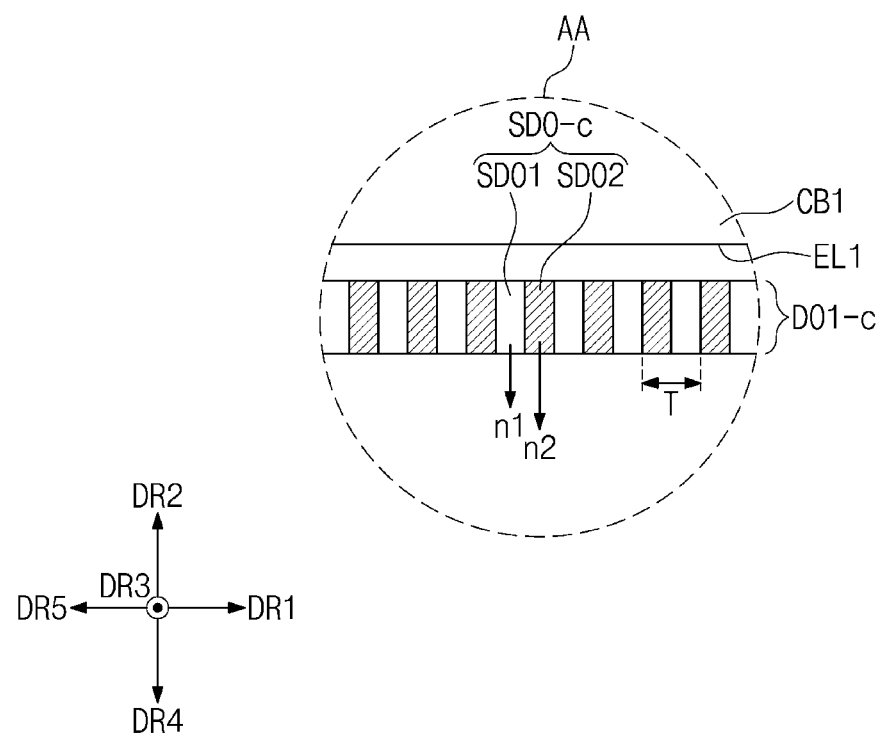
FIG. 5C is an enlarged schematic plan view of a virtual image display device according to an embodiment of the disclosure.

The light diffraction parts DO1 and DO2 may diffract light outputted through the light output surfaces EL1 and EL2 of the light combining parts CB1 and CB2. The light diffracted by the light diffraction parts DO1 and DO2 may be recognized by the user. For example, each of the light diffraction parts DO1 and DO2 may include a surface relief grating, a blaze grating, or a holographic optical element (HOE). However, embodiments of the disclosure are not limited thereto. For example, each of the light diffraction parts DO1 and DO2 may include all sorts of material capable of diffracting light. Examples of the light diffraction parts DO1 and DO2 according to an embodiment of the disclosure are illustrated in FIGS. 5A to 5C and will be described later with reference to FIGS. 5A to 5C.

Each of the first to fourth display parts DP1, DP2, DP3, and DP4 may include a display panel. The display panel included in each of the first to fourth display parts DP1, DP2, DP3, and DP4 may output an image to be provided to the user to the first and second light combining parts CB1 and CB2.

The display panel may be an organic light emitting display panel, a liquid crystal display panel, or a micro-LED display panel. However, embodiments of the disclosure are not limited thereto. The organic light emitting display panel may include an organic light emitting device, the liquid crystal display panel may include a liquid crystal layer, and the micro-LED display panel may include a micro-light emitting diode.

The display panel may be a rigid or flexible display panel. In case of the flexible display panel, the display panel may be deformed in shape by an operation such as bending, folding, or rolling.

As an example of an embodiment of the display panel, the organic light emitting display panel is illustrated in FIG. 4. However, embodiments of the disclosure are not limited to the display panel DPN.

Referring to FIG. 4, the display panel DPN may include a base layer SUB, a circuit layer DP-CL, a light emitting device layer DP-OLED, and an encapsulation layer TFE.

The base layer SUB may be rigid or flexible. The base layer SUB may include a polymer substrate, a plastic substrate, a glass substrate, a metal substrate, a composite substrate, or a combination thereof. The base layer SUB may have a multi-layered structure as well as a single-layered structure. The base layer SUB may include a synthetic resin film and have a multi-layered structure including synthetic resin films. The synthetic resin film may include a polyimide-based film, an acrylic-based film, an epoxy-based film, a urethane-based film, a cellulose-based film, a parylene-based film, or a combination thereof. However, embodiments of the disclosure are not limited to the material of the synthetic resin film.

The circuit layer DP-CL may be disposed on the base layer SUB. The circuit layer DP-CL may include at least one insulation layer, a semiconductor pattern, a conductive pattern, a signal line, a pixel line, etc. The circuit layer DP-CL may include transistors of the semiconductor pattern, the conductive pattern, the signal line, etc.

FIG. 4 illustrates a cross-section of insulation layers BFL, 10, 20, and 30 and a thin-film transistor TFT of multiple thin-film transistors, which may be included in the circuit layer DP-CL. Each of the thin-film transistors TFT included in the circuit layer DP-CL may include a control electrode, an input electrode, and an output electrode.

Each of the insulation layers BFL, 10, 20, and 30 may include an organic material and/or an inorganic material and have a single-layered structure or a multi-layered structure. Some of the insulation layers BFL, 10, 20, and 30 may be omitted. For example, the buffer layer BFL may be omitted. Embodiments of the circuit layer DP-CL are not limited thereto, another insulation layer may be further provided.

The light emitting device layer DP-OLED may be disposed on the circuit layer DP-CL. The light emitting device layer DP-OLED may include a pixel defining layer PDL and a light emitting device OLED.

The light emitting device OLED may include a first electrode AE and a second electrode CE, which face each other, with light emitting functional layers disposed therebetween. As illustrated in FIG. 4, the light emitting device OLED according to an embodiment may include a hole transport region HCL, a light emitting layer EML, and an electron transport region ECL, which may be sequentially laminated between the first electrode AE and the second electrode CE. However, embodiments of the disclosure are not limited to the laminated structure of the light emitting functional layers. For example, the hole transport region HCL and the electron transport region ECL may be omitted, and other functional layers may be further included.

The light emitting device OLED may emit light by re-coupling a hole and an electron, which may be injected from the first electrode AE and the second electrode CE, in the light emitting layer EML. Light generated in the light emitting layer EML may be colored light having a specific wavelength range. For example, the colored light may be red light, green light, or blue light. However, embodiments of the disclosure are not limited thereto. The light generated in the light emitting layer EML may be outputted toward an upper side of the light emitting device layer DP-OLED.

Here, the light emitting device OLED according to an embodiment of the disclosure may include a nano-light emitting device or a quantum dot light emitting device in addition to the organic light emitting device. A light emitting source included in the light emitting layer EML may be a nano-material, a quantum dot, or a quantum rod, and the light emitting device OLED may provide light by the light emitting source included in the light emitting layer EML.

The pixel defining layer PDL may be disposed on the circuit layer DP-CL. An opening may be defined in the pixel defining layer PDL. The opening of the pixel defining layer PDL may expose at least a portion of the first electrode AE.

Each of pixel areas of the display panel DPN may be divided into a light emitting area on which the light emitting device OLED may be disposed and a non-light emitting area disposed adjacent to the light emitting area. The opening of the pixel defining layer PDL may be defined in correspondence to the light emitting area. The pixel defining layer PDL may correspond to the non-light emitting area adjacent to the light emitting area.

The pixel defining layer PDL may include an organic resin or an inorganic material. For example, the pixel defining layer PDL may include a polyacrylate-based resin, a polyimide-based resin, a silicon nitride (SiNx), a silicon oxide (SiOx), a silicon oxynitride (SiOxNy), or a combination thereof. However, embodiments of the disclosure are not limited to the above-described materials.

The encapsulation layer TFE may be disposed on the light emitting device layer DP-OLED to seal the light emitting device layer DP-OLED. The encapsulation layer TFE may protect the light emitting device OLED from moisture and/or oxygen and from foreign substances such as dust particles.

Although the encapsulation layer TFE having one layer is illustrated in FIG. 4, the encapsulation layer TFE may include at least one organic layer or inorganic layer or an organic layer and an inorganic layer. For example, the encapsulation layer TFE may have a structure in which an organic layer and an inorganic layer may be alternately and repeatedly laminated or a structure in which an inorganic layer, an organic layer and an inorganic layer may be sequentially laminated.

Although the inorganic layer included in the encapsulation layer TFE may include, e.g., a silicon nitride layer, a silicon oxynitride layer, a silicon oxide layer, a titanium oxide layer, an aluminum oxide layer, or a combination thereof, embodiments of the disclosure are not particularly limited thereto. Although the organic layer included in the encapsulation layer TFE may include an acrylic-based organic layer, embodiments of the disclosure are not particularly limited thereto.

FIGS. 5A to 5C are enlarged schematic plan views of the virtual image display device according to an embodiment of the disclosure. FIGS. 5A to 5C illustrate area AA of the virtual image display device VD in FIG. 3. FIGS. 5A to 5C are enlarged plan views illustrating the first light diffraction part DO1 including sub-diffraction portions SDO-a, SDO-b, and SDO-c having different shapes, and following descriptions may be equally applied to the second light diffraction part DO2.

Light outputted from the light combining parts CB1 and CB2 through the light output surfaces EL1 and EL2 may be diffracted while transmitting through the light diffraction parts DO1 and DO2. A diffraction angle of the light may be affected by a structure of the light diffraction parts DO1 and DO2. Each of the sub-diffraction portions may be provided in plurality and included in the light diffraction parts DO1 and DO2. The sub-diffraction portions may be arranged with a period T. The period T of the sub-diffraction portions represents a gap with which the sub-diffraction portions may be repeated along a direction.

The sub-diffraction portion may include various type embodiments. For example, a protruding type sub-diffraction portion may be one type. A light diffraction parts DO1-a and DO1-b according to an embodiment in FIGS. 5A and 5B includes a base portion BS and the protruding type sub-diffraction portion SDO-a and SDO-b protruding from the base portion BS.

The sub-diffraction portions SDO-a and SDO-b in FIGS. 5A and 5B may be different in protruding shape. As illustrated in FIG. 5A, the sub-diffraction portion SDO-a according to an embodiment may be a protruding portion having a rectangular cylinder shape. As illustrated in FIG. 5B, the sub-diffraction portion SDO-b according to an embodiment may be a protruding portion having a sawtooth shape. The protruding portion having the sawtooth shape may have a triangular shape on a plane. However, embodiments of the disclosure are not limited to the shape of the protruding portion. The shape of the protruding portion may include various shapes capable of diffracting light at various angles.

The protruding portion may be provided in plurality, and the protruding portions may be arranged with the period T along a direction. Referring to FIGS. 5A and 5B, the sub-diffraction portions SDO-a and SDO-b may include the protruding portions arranged with the period T along the direction of the first directional axis DR1.

Referring to FIG. 5A, a protruding portion of the protruding portions that protrude from the base portion BS may be spaced a gap from the neighboring protruding portion. The protruding portions having the same width in the direction of the first directional axis DR1 may be spaced a gap from each other in the direction of the first directional axis DR1. The period T of the sub-diffraction portions SDO-a included in the light diffraction part DO1-a according to an embodiment may be a sum of the spaced gap and the width of the protruding portion in the direction of the first directional axis DR1.

Referring to FIG. 5B, protruding portions having the same width in the direction of the first directional axis DR1 may be arranged in the direction of the first directional axis DR1. Depending on a shape of the protruding portion, a spaced space may be defined between neighboring protruding portions. The period T of the sub-diffraction portions SDO-b included in the light diffraction part DO1-b according to an embodiment may be the width of the protruding portion in the direction of the first directional axis DR1.

The sub-diffraction part SDO-c in FIG. 5C may include a first sub-diffraction portion SDO1 and a second sub-diffraction portion SDO2, which may be arranged in a direction. Each of the first sub-diffraction portion SDO1 and the second sub-diffraction portion SDO2 may be provided in plurality, and the plurality of first sub-diffraction portions SDO1 and the plurality of second sub-diffraction portions SDO2 may be sequentially arranged with the period T while contacting each other. The period T of the sub-diffraction portions SDO-c included in the light diffraction part DO1-c according to an embodiment may be a sum of each width of the first sub-diffraction portion SDO1 and the second sub-diffraction portion SDO2 in the direction of the first directional axis DR1.

The first sub-diffraction portion SDO1 may have a refractive index n1 that may be different from a refractive index n2 of the second sub-diffraction portion SDO2. Thus, the light diffraction part DO1-c according to an embodiment may have a shape in which the sub-diffraction portions SDO1 and SDO2 each having a different refractive index may be sequentially arranged in a direction. The direction may be a direction from the left eye US-L to the right eye US-R.

Although FIGS. 5A to 5C illustrate the cross-section, the direction having the period T is not limited to the direction of the first directional axis DR1. The light diffraction part DO1 and DO2 may include the sub-diffraction portions arranged over an entire top surface of the light diffraction part DO1 and DO2, and the sub-diffraction portions may be arranged with the period T in the direction of each of the first directional axis DR1 and the third directional axis DR3.

Figure 6:
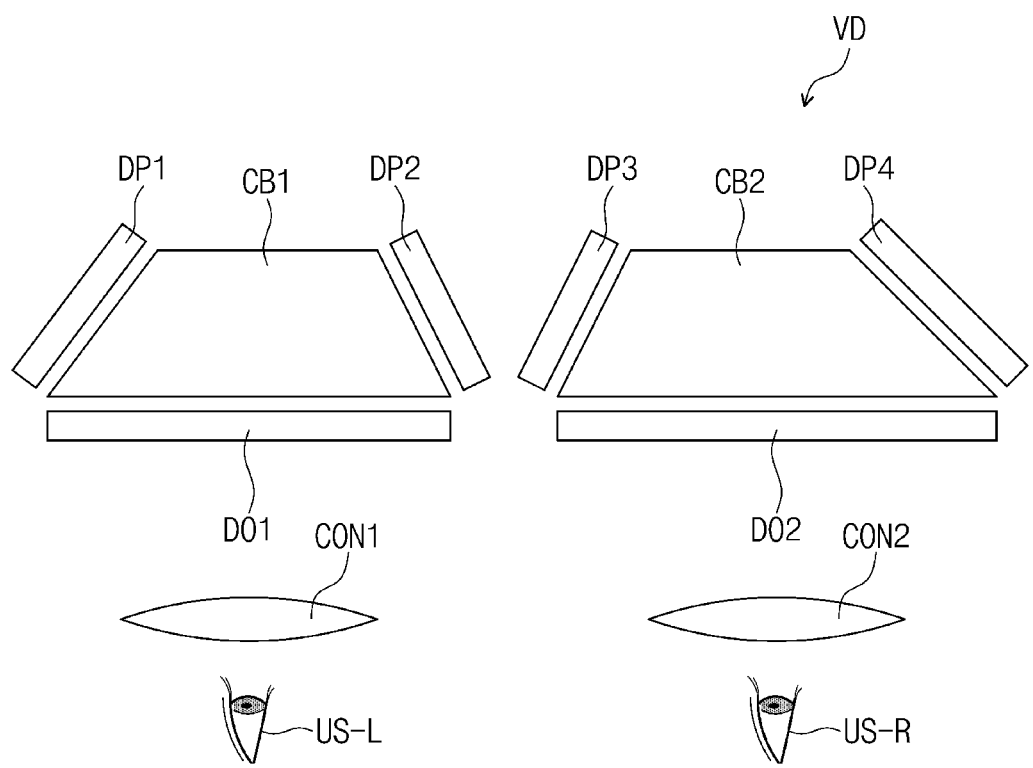
FIG. 6 is a schematic plan view of the virtual image display device according to an embodiment of the disclosure.
Figure 6:
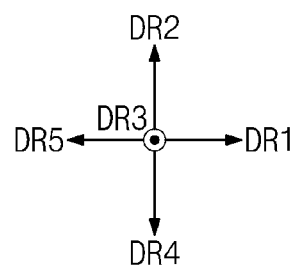

FIG. 6 is a schematic plan view of a virtual image display device according to an embodiment of the disclosure. Although a virtual image display device VD in FIG. 6 may have substantially the same configuration as the virtual image display device VD in FIG. 3, aspects thereof may be partially different. Thus, points of distinction will be described below.

The virtual image display device VD according to an embodiment may further include a condensing lens CON1 and CON2. The condensing lens CON1 and CON2 may be provided in plurality, and the condensing lenses CON1 and CON2 may be disposed in correspondence to the left eye US-L and the right eye US-R of the user, respectively. The virtual image display device VD may include a first condensing lens CON1 disposed on a first light diffraction part DO1 in the direction of the fourth directional axis DR4 and a second condensing lens CON2 disposed on a second light diffraction part DO2 in the direction of the fourth directional axis DR4.

Colored light images outputted by the display parts DP1, DP2, DP3, and DP4 may be outputted by transmitting through the light output surfaces EL1 and EL2 (refer to FIG. 3) of the light combining parts CB1 and CB2 and the light diffraction parts DO1 and DO2. Light transmitted through the light diffraction parts DO1 and DO2 may be diffracted and thus outputted with various and wide angles, and the condensing lenses CON1 and CON2 may collect the outputted light so that the images may be formed on the left-eye US-L and the right eye US-R of the user.

Figure 7:
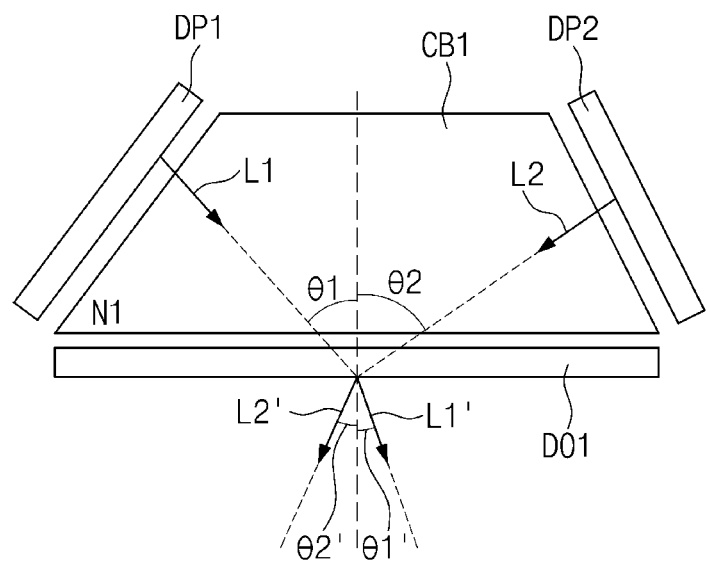
FIG. 7 is an enlarged schematic plan view of the virtual image display device according to an embodiment of the disclosure.
Figure 7:
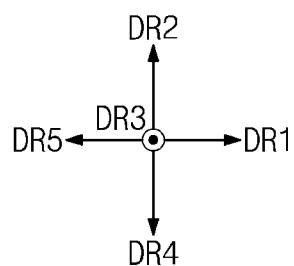

FIG. 7 is an enlarged schematic plan view of the virtual image display device according to an embodiment of the disclosure. FIG. 7 illustrates only the first light combining part CB1 of the virtual image display device VD according to an embodiment in FIG. 3. The following description may be equally applied to the second light combining part CB2.

Referring to FIG. 7, each of the first display part DP1 and the second display part DP2 may output light toward the first light combining part CB1. Light incident to the first light combining part CB1 of the light outputted by the first display part DP1 may be defined as first light L1, and light incident to the first light combining part CB1 of the light outputted by the second display part DP2 may be defined as second light L2.

The light incident to the first light combining part CB1 may be incident at a specific angle. An incident angle of the first light L1 may be defined as a first incident angle θ1, and an incident angle of the second light L2 may be defined as a second incident angle θ2. Here, the incident angle θ may be defined as an angle between a normal of the light output surface and the light incident toward the light output surface.

The light incident at a specific angle may be outputted by transmitting the first light diffraction part DO1 disposed on the light output surface EL1 (refer to FIG. 3) of the first light combining part CB1. The outputted light may be outputted at an angle different from the incident angle. An output angle of the first light L1' may be defined as a first light output angle θ1', and an output angle of the second light L2' may be defined as a second light output angle θ2'. Here, the light output angle θ' may be defined as an angle between a normal of the light diffraction part and the light outputted from the light diffraction part.

The angle of the light outputted from the first light diffraction part DO1 may be varied according to the incident angle of light, the wavelength of light, the refractive index N1 of the first light combining CB1, and the repeated period T of the sub-diffraction portions included in the first light diffraction part DO1. The output angle of the light outputted from the first light diffraction part DO1 according to an embodiment may be a value satisfying equation 1 below.

$$\theta' = A\sin\left\{N1 \cdot \sin(\theta) \pm m \cdot \left(\frac{\lambda}{T}\right)\right\}. \quad \text{[Equation 1]}$$

In the above equation 1, θ' may be a light output angle, N1 may be a refractive index of the light combining part, θ may be an incident angle, m may be an integer in a range from 0, ±1, ±2 to ±n, λ may be a wavelength of the incident light, T may be a repeated period of the sub-diffraction portions included in the light diffraction part.

Table 1 below represents the light output angle according to the period of the sub-diffraction portions and the wavelength of light. For example, the light combining part has a refractive index of about 1.5. T1, T2, and T3 represent the period with which the sub-diffraction portions may be repeated, and the period gradually increases from T1 to T3.

TABLE 1

| Wavelength (nm) | T1 | T2 | T3 |
| --- | --- | --- | --- |
| 450 | 43.0° | 36.9° | 34.5° |
| 532 | 53.7° | 45.2° | 42.0° |
| 650 | 80.0° | 60.1° | 54.8° |

Referring to Table 1, it will be understood that the light output angle gradually decreases as the repeated period of the sub-diffraction portions included in the light diffraction part increase. Thus, the shorter the repeated period of the sub-diffraction portions, the wider a range of the light output angle. Also, the light output angle may increase as the wavelength of light increases. For example, in case that red light and green light are incident at the same incident angle, a light output angle of the red light may be greater than that of the green light. Thus, a light output distribution may be varied according to the wavelength of the colored light image.

In the virtual image display device according to an embodiment, the display part outputting the colored light image having a short wavelength may be further inclined to be more adjacent to the light output surface than the display part outputting the colored light image having a long wavelength. A light output distribution and an overlap degree of colored light according to the wavelength of the colored light may be adjusted by adjusting an inclination of the display part.

The virtual image display device according to an embodiment may adjust the light output distribution of the colored image by designing the light combining part and the light diffraction part. Specifically, the light output distribution may be adjusted by adjusting angles of inclined surfaces of the light combining part, the refractive index of the light combining part, arrangement of the display parts, and the period of the sub-diffraction portions included in the light combining part. Through this, luminance of an image formed on the eyes of the user may be enhanced. A resolution of the outputted light may be enhanced by overlapping the colored light images through the light combining part and the light diffraction part.

Figure 8A:
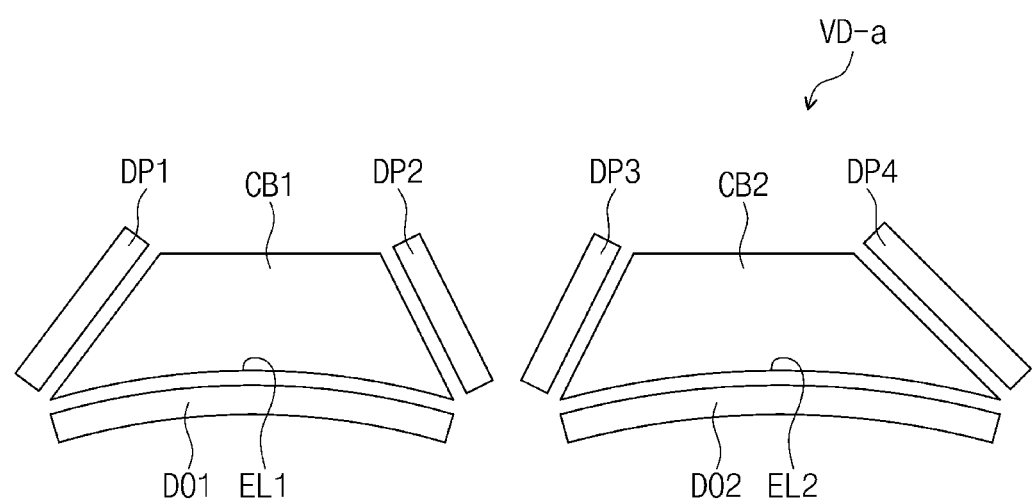
FIG. 8A is a schematic plan view of a virtual image display device according to an embodiment of the disclosure.
Figure 8B:
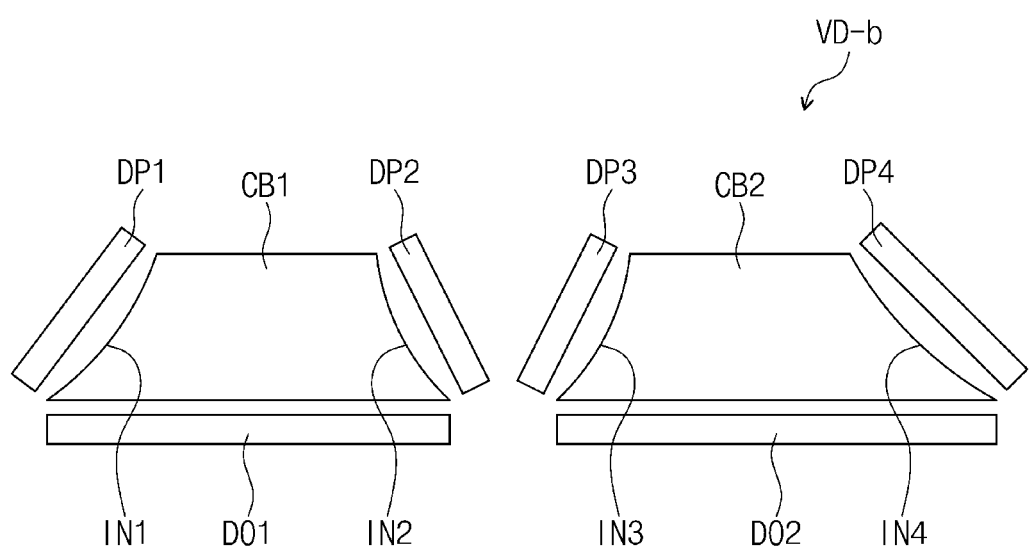
FIG. 8B is a schematic plan view of a virtual image display device according to an embodiment of the disclosure.

FIGS. 8A and 8B are schematic plan views of virtual image display device according to an embodiment of the disclosure. Each of light combining parts CB1 and CB2 according to an embodiment may include at least one curved surface. For example, at least one of first to fourth inclined surfaces IN1, IN2, IN3, and IN4 and first and second light output surfaces EL1 and EL2 may be a curved surface. As at least one curved surface may be included in each of the light combining parts CB1 and CB2, a light output distribution may be varied.

At least one of the first and second light output surfaces EL1 and EL2 may be a curved surface. Referring to FIG. 8A, a virtual image display device VD-a is illustrated in which the first light output surface EL1 and the second light output surface EL2 may be curved surfaces.

At least one of the first to fourth inclined surfaces IN1, IN2, IN3, and IN4 may be a curved surface. Referring to FIG. 8B, a virtual image display device VD-b in which each of first to fourth inclined surfaces IN1, IN2, IN3, and IN4 may be a curved surface is illustrated.

Each of the light output surfaces EL1 and EL2 may be a curved surface that may be convex in an inward direction of each of light combining parts CB1 and CB2. Thus, light outputted from the light output surfaces EL1 and EL2 which may be the curved surfaces may be condensed toward the eye of the user. Thus, an image may be easily formed on each of the left eye US-L and the right eye US-R of the user even without an additional condensing lens, and a volume of the virtual image display device VD-b may be reduced.

Each of the light diffraction parts DO1 and DO2 disposed on the light output surfaces EL1 and EL2, respectively, may be a convex curved surface in an inward direction of each of the light combining parts CB1 and CB2 in correspondence to shapes of the light output surfaces EL1 and EL2. The light diffraction part DO1 and DO2 may contact an upper portion of the light output surface EL1 and EL2 having the curved surface shape to have a curved surface shape in conjunction with the light output surface EL1 and EL2.

Each of the inclined surfaces IN1, IN2, IN3, and IN4 may be a curved surface that may be convex in the inward direction of each of the light combining parts CB1 and CB2. For example, each of the inclined surfaces IN1, IN2, IN3, and IN4 may be a curved surface that may be convex in an outputted direction of light from each of display parts DP1, DP2, DP3, and DP4. As each of the inclined surfaces IN1, IN2, IN3, and IN4 has the curved surface shape, a distribution of light that may be outputted from the display parts DP1, DP2, DP3, and DP4 and incident into the light combining parts CB1 and CB2 may be adjusted.

Convex degrees, e.g., curvatures, of the first light output surface EL1, the second light output surface EL2, and the inclined surfaces IN1, IN2, IN3, and IN4 may be equal to or different from each other, or only some thereof may be equal to each other. The distribution of outputted light may be varied according to a curvature of each surface, and the luminance and the resolution may be enhanced by adjusting the distribution of the light.

The first light combining part CB1 and the second light combining part CB2 may be different in shape. For example, the first light output surface EL1 of the first light combining part CB1 may have a curved surface shape, and each of the first and second inclined surfaces IN1 and IN2 may have a flat surface shape. However, the second light output surface EL2 of the second light combining part CB2 may have a flat surface shape, and each of the third and fourth inclined surfaces IN3 and IN4 may have a curved surface shape.

In each of the light combining parts CB1 and CB2, at least one of the light output surfaces EL1 and EL2 and the inclined surfaces IN1, IN2, IN3, and IN4 included in the light combining parts CB1 and CB2 may be a curved surface, or all thereof may be curved surfaces. In case of the first light combining part CB1, for example, each of the first light output surface EL1 and the first inclined surface IN1 may be a curved surface, the second inclined surface IN2 may be a flat surface, or all of the first light output surface EL1 and the first and second inclined surfaces IN1 and IN2 may be curved surfaces.

Figure 9:
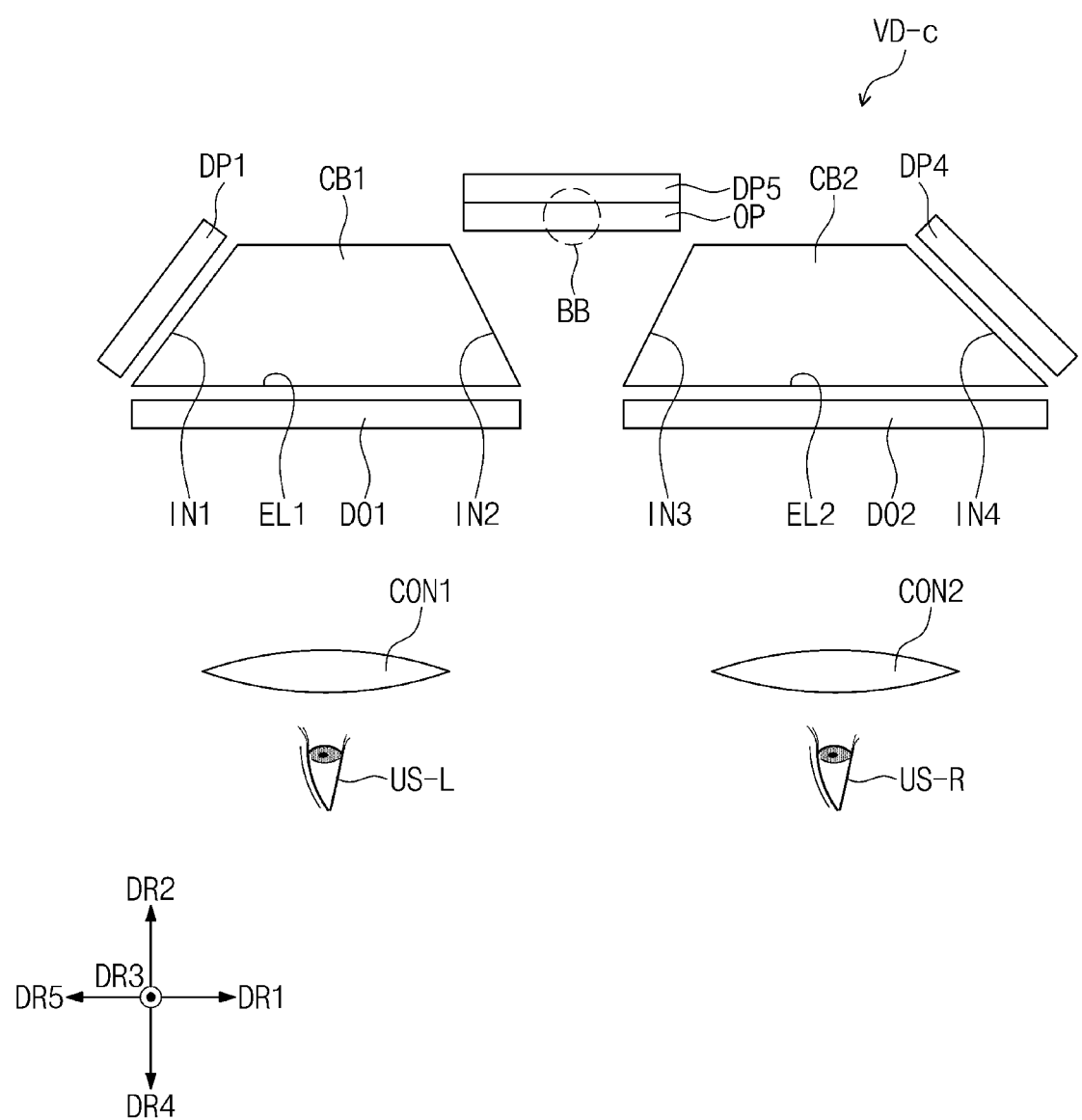
FIG. 9 is a schematic plan view of a virtual image display device according to an embodiment of the disclosure.

FIG. 9 is a schematic plan view of another virtual image display device according to an embodiment of the disclosure. Although a virtual image display device VD-c in FIG. 9 may have substantially the same configuration as the virtual image display device VD in FIG. 3, aspects thereof may be partially different. Thus, points of distinction will be described below with reference to FIG. 9.

As illustrated in FIG. 3, the first display part DP1 and the fourth display part DP4 may be spaced apart from each other with the light combining parts CB1 and CB2 therebetween, and the second display part DP2 and the third display part DP3 may be disposed adjacent to each other while being spaced apart from each other. The second display part DP2 and the third display part DP3 may output light in different directions. Referring to FIG. 3, the second display part DP2 may output light in a direction between the fourth directional axis DR4 and the fifth directional axis DR5, and the third display part DP3 may output light in a direction between the first directional axis DR1 and the fourth directional axis DR4.

Each of the second display part DP2 and the third display part DP3 may output same colored light images. The second display part DP2 and the third display part DP3 may be disposed symmetric with respect to an axis extending along the direction of the second directional axis DR2.

The second display part DP2 and the third display part DP3, which may be adjacent to each other, may be integral with each other as illustrated in FIG. 9. The second display part DP2 and the third display part DP3, which may be integral with each other, may output the same colored light images. The second display part DP2 and the third display part DP3, which may be integral with each other, may be defined as a fifth display part DP5.

Each of the first display part DP1, the fourth display part DP4, and the fifth display part DP5 may output different colored light images from each other. For example, the first display part DP1 may output a green light image, the fourth display part DP4 may output a red light image, and the fifth display part DP5 may output a blue light image. However, embodiments of the disclosure are not limited to the above colored light outputted from the display parts.

A virtual image display device VD-c according to an embodiment may improve a resolution and luminance while simultaneously reducing the number of the laminated display parts. As the number of the laminated display parts decreases, a process may be simplified, and a volume and a weight of the virtual image display device VD-c may be reduced.

The fifth display part DP5 may be disposed in a spaced space between the first light combining part CB1 and the second light combining part CB2. The fifth display part DP5 may overlap the second inclined surface IN2 of the first light combining part CB1 and the third inclined surface IN3 of the second light combining part CB2 in the direction of the second directional axis DR2. A normal direction of a top surface of the fifth display part DP5 may intersect a direction in which the first light combining part CB1 and the second light combining part CB2 may be spaced apart from each other. For example, the fifth display part DP5 may be disposed in a direction parallel to each of the light output surfaces EL1 and EL2 of the light combining parts CB1 and CB2.

The virtual image display device VD-c according to an embodiment may further include an optical functional layer OP disposed on the fifth display part DP5. The optical functional layer OP may change a path of light outputted from the fifth display part DP5. For example, the fifth display part DP5 may output light in the direction of the fourth directional axis DR4, and the optical functional layer OP may change the path of the light so that the outputted light may be incident to the second inclined surface IN2 and the third inclined surface IN3.

Figure 10:
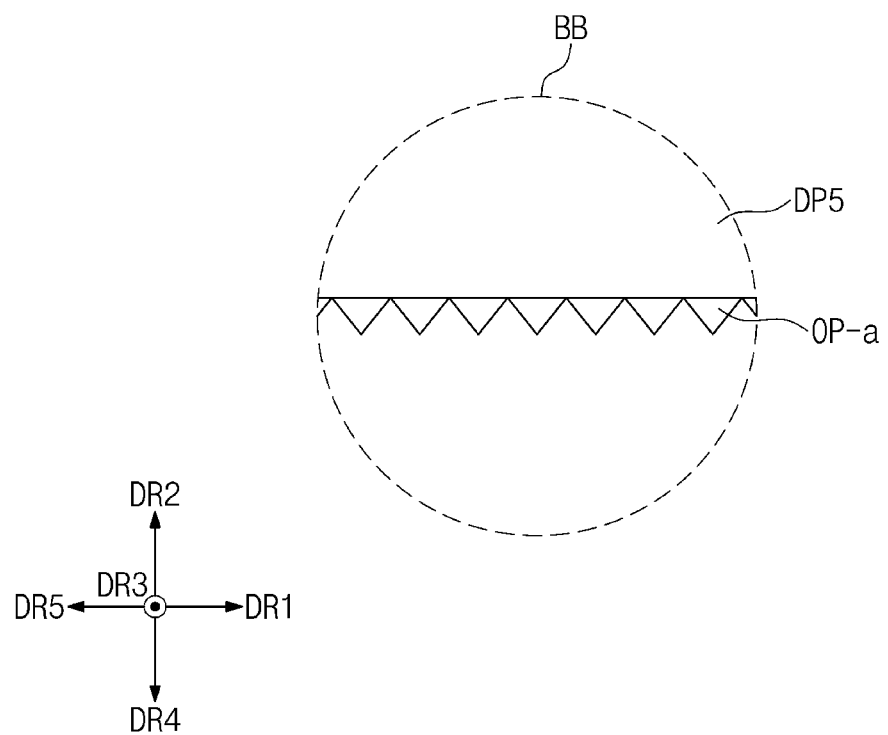
FIG. 10 is an enlarged schematic plan view of the virtual image display device according to an embodiment of the disclosure.

FIG. 10 is an enlarged schematic view of a partial area BB of the fifth display part DP5 and the optical functional layer OP in FIG. 9, illustrating an optical functional layer OP-a. As illustrated in FIG. 10, the optical functional layer OP-a according to an embodiment may be a layer in which multiple protruding portions may be repeatedly arranged. Although the protruding portion having a triangular shape on a plane is illustrated, embodiments of the disclosure are not limited to the shape of the protruding portion. For example, the protruding portion may have various shapes such as a semicircle or a rectangle.

The path of the light outputted from the fifth display part DP5 may be changed by the protruding portions. The optical functional layer OP-a may change the path so that front light outputted by the fifth display part DP5 in the direction of the fourth directional axis DR4 may be changed into side light. For example, the optical functional layer OP-a may be a prism sheet or a diffraction optical element. As the path of the light may be changed, the light outputted from the fifth display part DP5 may be incident to the first light combining part CB1 and the second light combining part CB2.

A virtual image display device may include laminated display parts outputting three kinds of colored light in correspondence to each of the left eye and the right eye of the user. A limitation of increasing a volume of a light collecting part for collecting the three kinds of colored light images may occur and a volume of the virtual image display device may increase. However, a virtual image display device according to an embodiment of the disclosure may reduce the laminated number of the display parts outputting colored light in correspondence to each of the left eye and the right eye of the user. Thus, the volume of the virtual image display device may be reduced.

Also, the virtual image display device according to an embodiment of the disclosure may be more simplified in structure and manufacturing process than the virtual image display device including the laminated display parts outputting the three kinds of colored light in correspondence to each of the left eye and the right eye of the user. Thus, the virtual image display device according to an embodiment of the disclosure may arrange pixels of the display panel so as to provide a high resolution image to the user. As the high resolution image may be provided to the user, a limitation in which a net pattern may be recognized by the user may be resolved.

Also, a virtual image display device may include a collimator, and the collimator may have a limitation of image formation due to restrictions in manufacturing. However, a virtual image display device according to an embodiment of the disclosure may omit a collimator disposed on each of the multiple display parts, and the virtual image display device having an improved optical efficiency and luminance may be provided to the user.

Although embodiments of the disclosure have been described, it is understood that the disclosure should not be limited to these embodiments but various changes and modifications can be made by one ordinarily skilled in the art within the spirit and scope of the disclosure.

Hence, the real protective scope of the disclosure shall be determined by the technical scope of the claims including equivalents thereof.

What is claimed is:

1. A virtual image display device comprising:
   a first light combining part;
   a second light combining part spaced apart from the first light combining part and disposed adjacent to the first light combining part in a direction;
   a first display part disposed on a first inclined surface of the first light combining part;
   a second display part disposed on a second inclined surface of the first light combining part;
   a third display part disposed on a third inclined surface of the second light combining part;
   a fourth display part disposed on a fourth inclined surface of the second light combining part;
   a first light diffraction part disposed on a first light output surface of the first light combining part; and
   a second light diffraction part disposed on a second light output surface of the second light combining part,
   wherein two of the first to fourth display parts output images of a same color light, and the other two of the first to fourth display parts output images of different color light, such that a combination of colors of the images into the first light combining part and a combination of colors of the images input into the second light combining part are different from each other.

2. The virtual image display device of claim 1, wherein each of the first display part and the second display part outputs images of different color light, and
   each of the third display part and the fourth display part outputs images of different color light.

3. The virtual image display device of claim 1, wherein each of the first display part, the second display part, the third display part, and the fourth display part outputs a red light, green light or blue light image.

4. The virtual image display device of claim 1, wherein an angle between the first light output surface and each of the first inclined surface and the second inclined surface is an acute angle, and
   an angle between the second light output surface and each of the third inclined surface and the fourth inclined surface is an acute angle.

5. The virtual image display device of claim 4, wherein the angle between the first light output surface and the first inclined surface is different from the angle between the first light output surface and the second inclined surface.

6. The virtual image display device of claim 5, wherein in case that an image outputted from the first display part has a wavelength shorter than a wavelength of an image outputted from the second display part, the angle between the first light output surface and the first inclined surface is less than the angle between the first light output surface and the second inclined surface.

7. The virtual image display device of claim 1, wherein at least one of the first inclined surface, the second inclined surface, the third inclined surface, the fourth inclined surface, the first light output surface, and the second light output surface is a curved surface, and
   the curved surface is convex in an inward direction of at least one of the first light combining part and the second light combining part.

8. The virtual image display device of claim 1, wherein each of the first light diffraction part and the second light diffraction part comprises:
   a base portion; and
   protruding portions that protrude from the base portion, and
   the protruding portions are arranged with a period in the direction.

9. The virtual image display device of claim 1, wherein
each of the first light diffraction part and the second light
diffraction part comprises:
   a first sub-diffraction portion; and
   a second sub-diffraction portion having a refractive index different from a refractive index of the first sub-diffraction portion,
each of the first sub-diffraction portion and the second sub-diffraction portion is provided in plurality, and
the plurality of first sub-diffraction portions and the plurality of second sub-diffraction portions are sequentially arranged in the direction.

10. The virtual image display device of claim 1, wherein
the second display part and the third display part are adjacent to each other, and
each of the second display part and the third display part outputs images of a same color light.

11. The virtual image display device of claim 10, wherein
the second display part and the third display part are integral with each other and disposed in a space between the first light combining part and the second light combining part.

12. The virtual image display device of claim 11, further comprising an optical functional layer disposed on the second display part and the third display part and comprising protruding portions.

13. The virtual image display device of claim 12, wherein the optical functional layer comprises a prism sheet.

14. The virtual image display device of claim 1, further comprising:
   a first condensing lens disposed on the first light diffraction part; and
   a second condensing lens disposed on the second light diffraction part.

15. The virtual image display device of claim 1, wherein
each of the first display part, the second display part, the third display part, and the fourth display part comprises a display panel, and
the display panel is at least one of organic light emitting display panel, a liquid crystal display panel, or a micro-light emitting diode display panel.

16. The virtual image display device of claim 1, wherein
one of the first light combining part and the second light combining part corresponds to a left eye of a user, and
the other of the first light combining part and the second light combining part corresponds to a right eye of the user.

17. A virtual image display device comprising:
a light combining part comprising:
   a top surface;
   a light output surface parallel to the top surface;
   a first inclined surface adjacent to a side of each of the top surface and the light output surface; and
   a second inclined surface adjacent to another side of each of the top surface and the light output surface, the side and the another side of each of the top surface and the light output surface facing each other;
a first display part disposed on the first inclined surface;
a second display part disposed on the second inclined surface; and
a light diffraction part disposed on the light output surface, wherein
an angle between the light output surface and each of the first inclined surface and the second inclined surface is an acute angle,
each of the first display part and the second display part outputs images of different color light, and
the angle between the light output surface and the first inclined surface is different from the angle between the light output surface and the second inclined surface.

18. The virtual image display device of claim 17, further comprising a condensing lens spaced apart from the light diffraction part and disposed parallel to the light output surface.

19. The virtual image display device of claim 18, wherein
an image outputted from the first display part has a wavelength shorter than a wavelength of an image outputted from the second display part.

20. The virtual image display device of claim 17, wherein
the light diffraction part is disposed parallel to the light output surface,
the light diffraction part comprises sub-diffraction portions arranged with a period in a direction, and
light incident at a first angle from the first display part is transmitted through the light combining part and outputted at a light output angle that satisfies the equation:

$$\theta' = A\sin\left\{N1 \cdot \sin(\theta) \pm m \cdot \left(\frac{\lambda}{T}\right)\right\}$$

where $\theta'$ is the light output angle, N1 is a refractive index of the light combining part, $\theta$ is the first angle, m is an integer, $\lambda$ is a wavelength of the incident light, and T is the period.

* * * * *